Aug. 8, 1939. H. A. THOMPSON 2,169,116
PRODUCT METER
Filed April 29, 1938
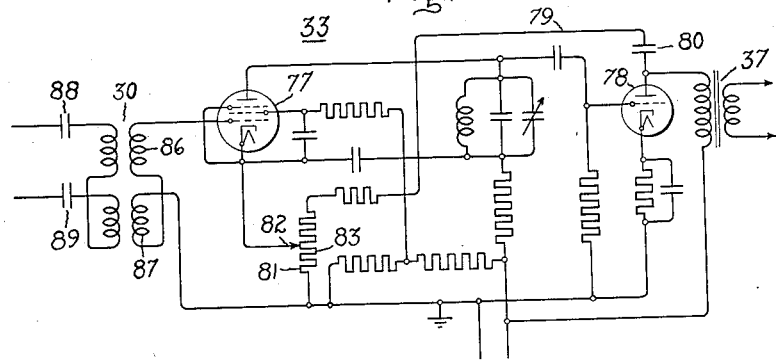
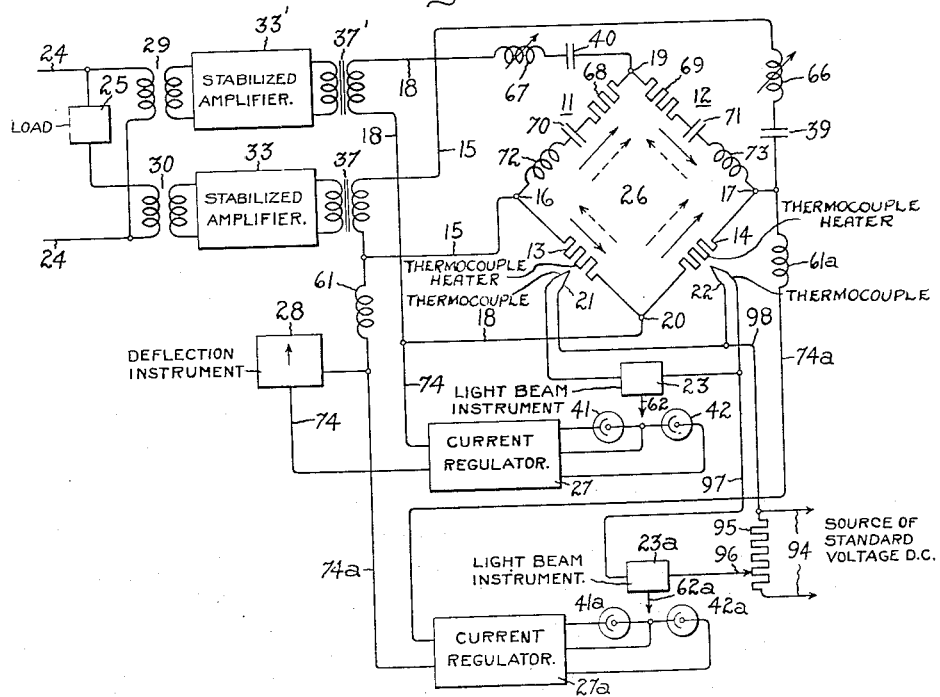
Inventor:
Harris A. Thompson,
by Harry E. Dunham
His Attorney.

Patented Aug. 8, 1939

2,169,116

UNITED STATES PATENT OFFICE 2,169,116

PRODUCT METER

Harris A. Thompson, Schenectady, N. Y., assignor to General Electric Company, a corporation of New York Application April 29, 1938, Serial No. 205,121

3 Claims. (Cl. 171—95)

My invention relates to electrical measuring devices and concerns particularly apparatus for measuring a quantity such as power, reactive component of power or some other quantity representing a product.

It is an object of my invention to provide a product measuring arrangement which is suitable for high frequencies such as radio frequencies, as well as for low frequencies, and which is unaffected by frequency variations.

It is a further object of my invention to provide apparatus which is highly sensitive and accurate although it imposes only a low burden on the circuit in which power or some other product is being measured.

Still another object of my invention is to provide a product measuring arrangement which may be used for transmitting indications or records to a distance.

It is furthermore an object of my invention to provide an arrangement in which thermocouples may be employed without any need for accurate matching of their characteristics or any need for having thermocouples which follow the same law of operation.

Still another object of the invention is to provide an arrangement in which the null method may be used in obtaining the thermocouple response, obviating any necessity for loading the thermocouples.

Other and further objects and advantages will become apparent as the description proceeds.

My invention constitutes an improvement in the wattmeter or product meter described in the copending application of Cramer W. La Pierre, Serial No. 205,120, filed concurrently herewith, and assigned to the same assignee as the present application. In the La Pierre product meter a four-arm bridge is employed, one of two currents to be multiplied is applied across one diagonal of the bridge, the other of the two currents to be multiplied is applied across the other diagonal of the bridge, and an auxiliary current is passed through one of the bridge arms to maintain the resultant current effects in two adjacent bridge arms substantially equal. My invention differs from the La Pierre arrangement principally in that I provide an additional auxiliary current which I pass through both of the last mentioned adjacent bridge arms in order that the current effects of these two adjacent bridge arms will not only be substantially equal but will also remain substantially constant. Consequently any difference in the relationship between variations in current and variations in current effect of the two adjacent bridge arms will not affect the accuracy of the apparatus.

In carrying out my invention in its preferred form I provide a four-arm bridge or square, two arms of which consist of thermal-current-responsive devices that are independent of frequency variations such as thermocouples, e. g., and I supply currents representing two quantities to be multiplied such as voltage and current to two different pairs of diagonally opposite points or terminals at the corners of the bridge or square so that the two currents to be multiplied flow in the same direction in one thermal-current-responsive arm of the bridge, and in opposite directions in the other thermal-current-responsive arm of the bridge. For reasons which will later be explained, the difference in heating of the two thermal-current-responsive arms represents the product of the instantaneous value of the currents or the power of the measured circuit if the arrangement is used as a wattmeter. In order to make the apparatus independent of the response characteristic of the thermocouples and in order to employ the null method of response the difference in the heating of the thermocouples is not measured directly, but an adjustable auxiliary current is supplied to one of the thermocouples to equalize the heating, and the auxiliary current is measured. The auxiliary current may be a direct current or a current of a different frequency from that in the main circuit and is supplied to the thermocouple which would otherwise be the cooler one. In distinction from the arrangement in the aforementioned copending La Pierre application, I also apply an additional auxiliary current to both of the thermocouples of sufficient value to maintain the thermocouples at a given temperature at all times so that the reading of the apparatus depends only upon the relationship between the thermocouple characteristics at the given temperature and is independent of any deviation therefrom at other temperatures. In order to make the arrangement automatic I provide suitable regulators or follow-up arrangements such as photoelectric follow-ups for automatically maintaining the auxiliary currents at the proper values.

The invention may be understood more readily from the following detailed description when considered in connection with the accompanying drawing and those features of the invention which are believed to be novel and patentable will be pointed out in the claims appended hereto. In the drawing, Fig. 1 is a detailed circuit diagram of a stabilized amplifier forming a part of the apparatus representing one embodiment of my invention. Fig. 2 is a circuit diagram and schematic representation of one embodiment of my invention. Like reference characters are utilized throughout the drawing to designate like parts.

Fig. 2 illustrates an arrangement for measuring the power drawn from an alternating current source 24 by a load 25. There is a four-arm bridge or square 26 having impedance arms 11 and 12 and two arms in the form of thermal-current-responsive elements such as thermocouple-heating resistors 13 and 14 cooperating with thermocouples 21 and 22 respectively. A pair of conductors 15 is connected to diagonally opposite points or terminals 16 and 17 of the bridge for supplying a current proportional to, and varying in phase with, current flowing through the load 25. A second pair of conductors 18 is connected to the diagonally opposite points or terminals 19 and 20 of the bridge 26 for supplying to the bridge a current proportional to, and varying in phase with, the voltage between the lines 24 across the load 25. There is a current responsive device 23 to which the thermocouples 21 and 22 are connected in opposition for comparison of their output voltage.

To avoid the necessity for matching the thermocouples 21 and 22 and in order to make the apparatus respond accurately regardless of whether or not the thermocouples 21 and 22 follow the theoretical square law of thermal-current-responsive devices, I provide a current regulator 27 such as a photoelectric follow-up device, for example, for passing an auxiliary current through one of the thermocouple heaters, for example, the heater 13 to equalize the thermocouple temperatures and for indicating the magnitude of the power measured by the apparatus, I provide a current responsive device 28 in series with the output conductors 74 of the current regulator 27.

In order to make it unnecessary for the thermocouples 21 and 22 to follow the same law of relationship between current in the heater and output voltage, I provide a second current regulator 27a for supplying an additional auxiliary current to the heaters of both thermocouples 13 and 14 of such a magnitude as to maintain the temperatures of the thermocouples 21 and 22 constant regardless of the magnitude of the power being measured by the apparatus. The current regulating systems will be described more in detail hereinafter.

Better results are ordinarily obtained from bridges if the currents supplied across the diagonally opposite terminals are of substantially the same order of magnitude, and furthermore, the power required to operate the bridge 26 may be too great to permit connecting the bridge terminals directly to the load 25. Accordingly, I provide a pair of power amplifiers 33' and 33 with input transformers 29 and 30 and output transformers 37' and 37, respectively, having such ratios of amplification and transformation as to make the currents in the conductors 18 and 15 substantially equal for the maximum voltage and current of the range for which the apparatus is designed.

The input transformer 29 is a potential transformer having a primary winding connected across the lines of the source 24 and a secondary winding connected to the input side of the amplifier 33', and the input transformer 30 is a current transformer having a primary winding in series with the load 25 and a secondary winding connected to the input side of the amplifier 33. The transformers 37 and 37' have their primary windings connected to the output sides of the amplifiers 33 and 33' and their secondary windings connected to the conductors 15 and 18 respectively.

The current regulator 27 may be a photoelectric follow-up device of the type described in Patent No. 1,897,850 La Pierre and in the aforesaid copending application of Cramer W. La Pierre, Serial No. 205,120. Such a photoelectric follow-up system includes a pair of photoelectric cells 41 and 42, means for producing a light beam 62 arranged to be deflected back and forth between the photoelectric cells 41 and 42 in response to the polarity and magnitude of current flowing in the current responsive device 23 and means within the regulator 27 (not shown) for causing an output current to flow through conductors 74 which maintains a constant value when the beam 62 is in a neutral position between the photoelectric cells 41 and 42, but which increases or decreases when the beam 62 deflects toward the photoelectric cell 42 or the photoelectric cell 41, respectively. The regulator 27 is arranged to supply auxiliary current of a different frequency from the source 24 or to supply direct current, more conveniently the latter.

The current responsive device 28 may be an indicating instrument, a recording instrument, or any other desired type of instrument for producing a response to variations in output current of the regulator 27 in response to variations in power of the load 25 and may be placed at a distance, if desired, for the purpose of providing remote indications or records. The output conductors 74 of the current regulator 27 are connected in series with the current responsive device 28 across the thermocouple heating resistor 13, and preferably a choke coil 61 is included in series with the connection in order to prevent alternating current disturbances reacting upon the regulator 27.

To prevent direct current from the auxiliary current sources passing through transformers 37 and 37', condensers 39 and 40 may be connected in the conductors 15 and 18 respectively and variable inductances 66 and 67 may be connected in series with the condensers 39 and 40 for overcoming the phase shift which would be introduced by the condensers 39 and 40.

The current regulator 27a may be similar in nature to that represented at 27, and the current regulating system associated with the device 27a includes a pair of photo-electric cells 41a and 42a, cooperating with a deflecting light beam 62a, controlled by a current responsive instrument 23a. For passing the second auxiliary heating current through both thermocouple heaters 13 and 14, the output conductors 74a of the current regulator 27a are connected to the terminals 16 and 17 of the bridge 26, preferably in series with choke coils 61 and 61a.

For providing a standard of comparison of temperature at which the thermocouple heaters 13 and 14 are kept constant, a source of constant voltage 94 is provided across which is connected a potentiometer 95 having an adjustable tap 96. The fixed end of potentiometer 95 is connected by means of a conductor 98 to one of the common terminals of the thermocouples 21 and 22, and the movable tap 96 is connected by a conductor 97 in series with the current responsive device 23a to the other of the output terminals of the thermocouple 22. The thermocouples 21 and 22, and the voltage source 94 have points of like polarity connected together so that they are in parallel. The potentiometer tap 96 is set at the voltage produced by the thermocouples 21 and 22 at the temperature at which they are to be held constant by the current regulator 27a.

The current regulating system including the photoelectric follow-up arrangement 27a is such that the output current through the conductors 74a, which are connected in series with the diagonal bridge terminals 16 and 17, remains constant when the light beam 62a is in a neutral position between the photoelectric light cells 41a and 42a, representing no current through the current responsive device 23a. The connections of the device 27a are such that the output current increases when the beam 62a is deflected in the direction to increase the illumination of photoelectric cell 41a, and the output current decreases when the beam 62 is deflected to increase the illumination of the photoelectric cell 42a.

The following action takes place when current is drawn by the load 25 from the line 24. The potential transformer 29 and the amplifier 33' cause a current to flow through the conductors 18 and the points 19 and 20 proportional to the line voltage. The current transformer 30 and the amplifier 33 cause a current proportional to that of the load 25 to be applied through the conductors 15 and the points 16 and 17. The same phase relationship is maintained between the currents in conductors 15 and 18 as between the current and the voltage in the load 25.

The product of the instantaneous currents in conductors 15 and 18 represents the output of the measured electrical source 24 or the power supplied to the load 25. For the sake of convenience arrows have been provided representing the directions of current flow in the bridge 26 at some given instant; the solid line arrows representing the current supplied by conductors 15 and the dotted line arrows representing the current supplied by the conductors 18. It will be seen that the currents are additive in the thermocouple heater 14 but subtractive in the thermocouple heater 13.

Disregarding for the present the current regulators 27 and 27a, if one assumes that the heating of the thermocouples 21 and 22 is proportional to the squares of the currents flowing in the heaters and represents the currents of conductors 15 and 18 by letters $a$ and $b$ respectively, the output of the thermocouple 22 will be proportional to $(a+b)^2$ and the output of the thermocouple 21 will be proportional to $(a-b)^2$. The response of the galvanometer 23 is then proportional to $(a+b)^2-(a-b)^2$ which equals $4ab$. It is seen, therefore, that the deflection of the galvanometer 23 represents the product of the two quantities $a$ and $b$. However, due to heat losses and other causes the outputs of thermocouples and other thermal-current-responsive devices are not strictly proportional to the square of the currents flowing therein and, therefore, if the thermocouples 21 and 22 are not accurately matched at all points of their characteristic curves and do not follow the same law of operation inaccuracies would result without the use of the regulators 27 and 27a.

Still disregarding the effect of the current regulator 27a, the action of the regulator 27 in equalizing the thermocouple temperatures may next be considered. It has been assumed that the direction of power flow is such that the thermocouple 13 tends to be the colder thermocouple. Accordingly, the output of the thermocouple 13 will be smaller than the output of the thermocouple 14 and the light beam 62 will be deflected to the left causing the light beam to be divided unevenly between the photoelectric cells 41 and 42. Thus the photoelectric cell 41 is caused to carry a greater current by reason of the characteristics of such photoelectric cells and the mechanism (not shown) in the follow-up arrangement 27 brings about an increase of the output current through the conductors 74. When the temperature of the heater 13 has been raised sufficiently to equalize the heating of the thermocouples 21 and 22, the light beam 62 falls back to the neutral position at which the photoelectric cells 41 and 42 are evenly illuminated and the current output of the follow-up arrangement 27 is maintained at the point attained.

Instead of measuring the difference in temperature between the thermocouples 21 and 22 to determine the power of the measured circuits one measures the auxiliary heating current required to maintain the thermocouples at the same temperature, and it becomes unnecessary for the thermocouples to follow the theoretical square law. It will be understood that the instrument 28 is calibrated in terms of the R. M. S. value of power.

When the effect of the current regulator 27a is considered it will be seen that it is also unnecessary for the thermocouples 21 and 22 to be matched or to follow the same law of relationship between output and heater current. If the power being measured is such that the thermocouple 22 would not be at the temperature corresponding to the voltage of the potentiometer tap 96 without auxiliary current, a potential difference will take place across the current responsive device 23a setting the regulator 27a in operation to supply an auxiliary current of such value as to raise both thermocouples to the standard temperature. The fact that the thermocouples follow different laws of operation, i. e. do not have the same outputs at all values of heater current is without consequence because comparisons are made only at the standard temperatures at which the thermocouples are matched or have a fixed relationship between their characteristics. However, I prefer to utilize thermocouples which are accurately matched at some temperature, preferably the one corresponding to maximum current in the thermocouple 14, and preferably the standard operating temperature of the thermocouples fixed by the setting of the potentiometer 95 is the one at which the thermocouples are matched. In the arrangement shown, the arms 11 and 12 of the bridge 26 include resistors 68 and 69, condensers 70 and 71, and inductances 72 and 73, respectively, preferably tuned substantially to balance the bridge 26 at the frequency principally to be employed. The condensers 70 and 71 serve to confine the auxiliary direct current from the follow-up arrangement 27 to only one thermocouple heater 13, and to keep the bridge symmetrical both internally and with respect to the amplifiers 33 and 33'.

The circuits of the stabilized amplifiers 33 and 33' are shown more in detail in Fig. 1. The amplifier circuit shown is a conventional amplifier circuit including a five-element tube 77 in the first stage and a three-element tube 78 in the final stage, with the exception that a degenerative or internal negative feed-back action is provided. The stabilizing effect is obtained by purposely designing the amplifier with excess amplification and the feeding back sufficient of the output voltage to the input side in such a manner as to reduce the overall amplification to the desired amount. The feed-back feature is provided by a conductor 79 connected to the anode side of the tube 78 through a coupling condenser 80 and connected to the control electrode circuit of the tube 77 through a resistor 81. In order to adjust the degree of degeneration, the resistor 81 may be provided with an adjustable tap 82, and the arrangement is such that the anode current of the tube 77 flows through the portion 83 of the resistor 81 below the tap 82. It will be seen that as the output of the amplifier 33 increases, greater voltage will be fed back to the resistor 83 increasing the potential of the tap 82, thereby decreasing the control electrode potential of the tube 77. In the case of any phase shift within the amplifier, the out-of-phase component fed back through the conductor 79 will be amplified to produce a component in the output voltage which brings it in phase with the input voltage.

My invention is not limited to specific numerical relationships but I have obtained satisfactory results by utilizing amplifiers which would have an excess gain of about 300 times if used as straight amplifiers, about two-thirds of the excess gain being lost by reason of the degeneration produced by the presence of the resistor 83 in the anode circuit of the first tube, and the remainder being cut to about one-hundredth by the direct feed-back 79. The direct feed-back also reduces the effects of any changes in the amplifier such as phase shift or amplification variations, etc. about $1/100$ of what they would be without the feed-back. Thus with a direct feed-back of 100, a 10% change in the amplifier would produce only a $1/10\%$ error in the output. In order that the amplifiers 33 and 33' may be alike, the input transformers 29 and 30 may be designed with ratios such as to give the same voltage output for full-scale voltage and current of the measured circuit 24.

In order to avoid disturbance from stray fields or other interference, the input transformers 29 and 30 may be made astatic by providing two sets of windings 86 and 87 which are reversed in their relative physical positions. Input condensers 88 and 89 may likewise be provided in the case of high frequency measurements in order to prevent excess voltage drops in the input transformer primaries by resonating them to the approximate frequency of the measured circuit.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. Apparatus responsive to the product of two currents comprising a bridge including four arms connected together to form a square, terminals at two opposite points of said square to serve as connections for one of said currents, and a second pair of terminals at the two remaining opposite points of the square to serve as connections for the other of said currents, two adjacent arms of said bridge comprising thermocouple heaters, thermocouples associated with said thermocouple heaters, a current responsive device to which said thermocouples are connected in opposition, an adjustable source for supplying auxiliary current to one of said thermocouple heaters, control mechanism in operative relation with the current responsive device for keeping the adjustable source in the adjustment producing a current at which the thermocouple temperatures are balanced and no current flows in the current responsive device, a second adjustable source for supplying a second auxiliary current to both of said thermocouple heaters, a standard voltage source, a second current responsive device connecting said standard voltage across said thermocouples, and control mechanism in operative relation to the second current responsive device to maintain the second auxiliary current at the value holding the thermocouples at the temperature at which their voltage balances the standard voltage.

2. Apparatus responsive to the product of two currents comprising a bridge including four arms connected together to form a square, terminals at two opposite points of said square to serve as connections for one of said currents, and a second pair of terminals at the two remaining opposite points of the square to serve as connections for the other of said currents, two adjacent arms of said bridge comprising thermal current responsive devices, means for supplying auxiliary current to one of said thermal current responsive devices, means responsive to the relative current effects in the two thermal current responsive devices for controlling the auxiliary current and maintaining a predetermined relationship between the temperatures of the two thermal current responsive devices, means for supplying a second auxiliary current to both of said thermal current responsive devices and means responsive to fluctuations in temperatures in one of said thermal current responsive devices for controlling the second auxiliary current to maintain said thermal current responsive device at a predetermined temperature.

3. Apparatus responsive to the product of two currents comprising a bridge including four arms connected together to form a square, terminals at two opposite points of said square to serve as connections for one of said currents, a second connections for one of said currents, a second pair of terminals at the two remaining opposite points of the square to serve as connections for the other of said currents, means responsive to the relative values of resultant effects of current flowing in two adjacent arms of the said bridge, an adjustable auxiliary current source connected to one of said latter bridge arms, means in operative relationship between the current source and the means responsive to current effects in the said adjacent bridge arms for maintaining the auxiliary current at a value giving a predetermined relationship between the resultant current effects in the said last mentioned two adjacent bridge arms, a second adjustable source of auxiliary current connected to both of said last mentioned bridge arms in series, and means responsive to the resultant current effects in one of said last mentioned bridge arms for adjusting the current supplied by the second auxiliary source to maintain the resultant current effects constant in the last mentioned bridge arm.

HARRIS A. THOMPSON.